May 16, 1933.                     H. T. O'NEILL                     1,908,859
                              LEADING IN CONDUCTOR
                              Filed June 27, 1930

INVENTOR
H. T. O'NEILL
BY
ATTORNEY

Patented May 16, 1933

1,908,859

UNITED STATES PATENT OFFICE

HENRY THOMAS O'NEILL, OF NEWARK, NEW JERSEY, ASSIGNOR TO WESTINGHOUSE LAMP COMPANY, A CORPORATION OF PENNSYLVANIA

LEADING IN CONDUCTOR

Application filed June 27, 1930. Serial No. 464,135.

This invention relates to the welding of metals and particularly relates to an improved method of forming welded unions in composite leading in conductors for electric discharge devices.

One of the objects of the present invention is to provide an improved composite leading in conductor for use in the manufacture of electric discharge devices.

Another object of this invention is to improve the method of welding tungsten, nickel and copper.

Another object of this invention is to produce a welded union of high tensile strength between tungsten and copper.

Other objects and advantages will be apparent as the invention is more fully disclosed.

Heretofore in the art it has been customary to form lead in conductors for use in electric discharge devices in sections, one section of which is adapted by reason of its specific composition to unite with glass and form an hermetic union therewith. On either side of this section, depending upon which extends within or without the enclosing envelope of the device, the other components of the leading in wire may vary materially from the component employed in the seal. It is essential that the union between the components of the leading in wire be relatively strong and continuously electrically conductive. Heretofore the union between these components has been obtained by electric welding means.

When the seal section of the leading in wire is comprised substantially of a highly refractory metal, such as tungsten or molybdenum, and the leading in conductor that is to be butt welded thereto is comprised of copper, such as stranded copper cable no effective union can be obtained by butt welding these two together.

It has been customary heretofore to effect a union of these two materials by enclosing the end of the copper in a nickel sleeve which is butt-welded to the end of the tungsten (or molybdenum) wire. At the weld the nickel and tungsten fuse together to form an alloy union. The copper and tungsten or the copper and nickel do not form an alloy union and the resulting composite weld thus obtained while electrically conductive is physically weak.

I have found that this weakness in the tungsten, nickel and copper union may be substantially eliminated by employing instead of the nickel sleeve member heretofore used a sleeve member comprised substantially of a bi-metallic strip member comprised of nickel interiorly faced with a metal, such as brass, which will alloy at least superficially with the copper. The welded union thus formed is inherently strong and of high tensile strength.

Before further disclosing the nature of my invention reference should be had to the accompanying drawing, wherein Fig. 1 is a side elevational view partly in section of a stem showing the application of the leading in conductors of the present invention;

Figure 1:
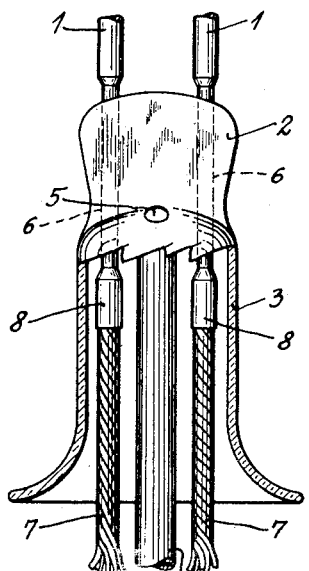

Referring to Fig. 1 leading in conductors 1 are shown sealed in position in the press 2 of stem 3 of standard type heretofore employed in the art. This particular stem is of the so-called tipless type as indicated by exhaust tube 4 having an opening 5 in the base of the press 2 of the stem. It will be noted that the leading in wire is comprised in the present example substantially of three sections; the upper section, denoted by numeral 1, is comprised of a refractory support wire which in the present instance comprises nickel, the center portion 6 extending through the press 2 is comprised of tungsten. The glass of the seal and of the stem is comprised substantially of what is known in the art as hard glass. Stranded section 7 of the leading in conductor is comprised of strands of copper wire and is joined to the said tungsten section 6 by means of sleeve member 8 which is welded to both the tungsten and to the copper, at the point of junction, by a process known in the art as "butt-welding."

In accordance with the practice of the present invention this sleeve member 8 is comprised of a bi-metallic strip member comprised substantially of nickel and interiorly faced with a metal or alloy such as brass, which will form an intimate bonded union with the copper of the stranded section 7.

Figure 2:
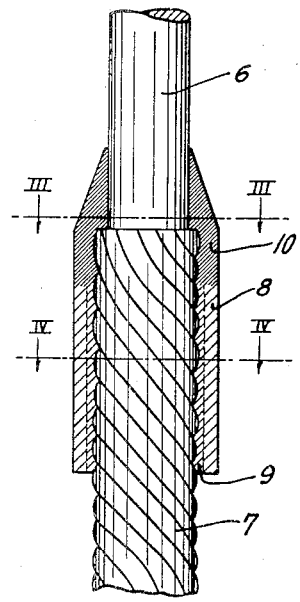
Fig. 2 is an enlarged side elevational view partly in cross section of a welded union formed by the practice of the present invention.

In Fig. 2 an enlarged side elevational view partly in cross section of the weld obtained by the practice of the present invention is shown. The welded union is formed in the same manner as heretofore employed. The end of the sleeve member 8 is fusibly united to the tungsten wire 6 by a butt-welding operation.

The heat energy liberated at the weld is sufficient to effect a melting of the brass surface of the sleeve member which flows around and alloys at least superficially with the copper conductor 7. In practice it is found that the brass lining of the sleeve member melts substantially over the entire length of the sleeve member and that portion which is not alloyed with the copper at the weld is fused about and within the interstices of the strands of the copper conductor, thus giving added strength to the composite union.

The interior component 9 of the sleeve member 8 is comprised preferably of brass having a composition giving a melting point approximating 950° C. This particular melting point material appears to be most satisfactory for the purposes of the present invention. Other compositions of materials giving other melting point alloys may be employed if desired.

The specific brass composition preferred has a copper content approximating 65 to 68%. During the welding operation it is believed that the heat energy evolved at the abutting ends of the tungsten and copper is sufficient to cause a substantial melting and alloying of the brass to the surface of the copper strands. The welded union thus obtained is extremely strong as compared to products heretofore obtained.

Figure 3:
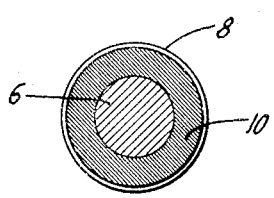
Fig. 3 is a view taken along plane III—III in Fig. 2.
Figure 4:
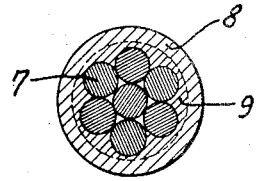
Fig. 4 is a cross sectional view taken along plane IV—IV Fig. 2.

Cross sectional views 3 and 4 illustrate the type of weld obtained by the practice of the present invention. It will be noted that in Fig. 3 the tungsten core 6 is enclosed by the nickel-brazing brass fusion 10. In Fig. 4 it will be noted that the outer nickel sleeve 8 is substantially unfused as are the strands of the center core 7, while the brass component 9 of the sleeve member has been caused to flow in such manner as to engage and interlock the strands of the core.

Figure 5:
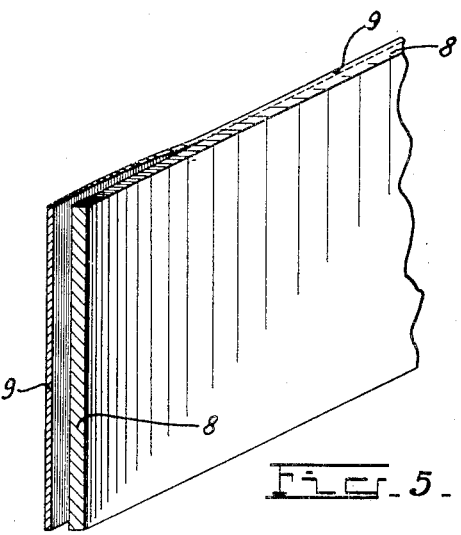
Fig. 5 is an enlarged perspective view of the bimetallic strip member employed in the present invention.

The bi-metallic strip member illustrated in Fig. 5 may be comprised substantially of nickel faced with brazing brass of the composition above set forth and may be formed in any convenient manner, such as has been heretofore employed in the art. Subsequent to forming it must be rolled to relatively thin sheets ranging from 5 to 25 mil in thickness depending upon the specific sized leading in wire to be formed. These sheets of brass faced nickel are then stamped and formed into the cylindrical sleeve members to be employed in the present invention.

As an example of the material advantage obtained by the practice of the present invention, nickel copper welds of the type herein described have an average tensile strength approximating 5000 pounds per square inch. Nickel brass copper welds made by the practice of the present invention of the same comparative size have a tensile strength approximating 15,000 pounds per square inch. By the prior art method of welding the tensile strength tests would vary in any single lot from 1500 pounds per square inch to 9000 pounds per square inch. With the present method of welding this variation in extremes is held within 1500 pounds per square inch of the average. This uniformity in product is of material commercial advantage.

Having broadly and specifically set forth the present invention it is apparent that there may be many variations from the specific embodiment herein described without departing essentially from the nature and scope of the invention as set forth in the accompanying claims.

What is claimed is:

1. A welded union comprising a refractory metal of the tungsten-molybdenum class and copper and a bi-metallic metal body comprising nickel and brass, the nickel portion thereof being fusibly united to the said brass and the brass portion thereof being fusibly united to the copper and to refractory metal.

2. A leading in conductor for electric discharge devices comprising a refractory metal of the tungsten-molybdenum class and copper, a but-welded union, said union being comprised of a nickel sleeve member interiorly faced with brazing brass enclosing the abutting ends of the refractory metal and the copper and fusibly united to the refractory metal and the copper.

3. A leading in conductor for electric discharge devices comprising tungsten wire, a stranded copper cable and a butt-welded union, said union comprising a nickel sleeve member interiorly faced with brazing brass enclosing the abutting ends of said tungsten and said copper cable and fusibly united to the said tungsten and copper.

In testimony whereof, I have hereunto subscribed my name this 25th day of June 1930.

HENRY THOMAS O'NEILL.